United States Patent [19]

Mason et al.

[11] 4,190,173
[45] Feb. 26, 1980

[54] BEVERAGE CONTAINER

[75] Inventors: LeRoy W. Mason, Baraboo; Frederick J. Furrer, Wisconsin Dells, both of Wis.

[73] Assignee: Flambeau Products Corporation, Baraboo, Wis.

[21] Appl. No.: 930,919

[22] Filed: Aug. 4, 1978

Related U.S. Application Data

[63] Continuation of Ser. No. 877,678, Feb. 14, 1978, abandoned.

[51] Int. Cl.² .................... A47G 19/22; B65D 51/18
[52] U.S. Cl. ................... 220/203; 220/90.4; 220/254; 220/303; 222/397; 222/516; 222/548
[58] Field of Search ............... 222/397, 548, 513, 512, 222/516, 555, 557; 215/315; 220/90.2, 90.4, 298, 203, 303, 254

[56] References Cited

U.S. PATENT DOCUMENTS

| | | | |
|---|---|---|---|
| 1,634,569 | 7/1927 | Bray | 220/298 |
| 1,713,354 | 5/1929 | Semack | 222/512 |
| 1,756,249 | 4/1930 | Kaufman | 215/307 |
| 2,533,915 | 12/1950 | Brooks | 222/513 |
| 2,817,451 | 12/1957 | Giles et al. | 222/248 X |
| 3,104,039 | 9/1963 | Dike | 222/248 X |
| 3,416,696 | 12/1968 | Alteneder, Jr. | 220/203 |
| 3,463,364 | 8/1969 | Rehag | 222/248 X |
| 3,918,606 | 11/1975 | Keller | 220/303 X |
| 3,967,748 | 7/1976 | Albert | 220/90.4 |

FOREIGN PATENT DOCUMENTS 1185853 10/1959 France ..................... 220/253

*Primary Examiner*—Allan N. Shoap
*Attorney, Agent, or Firm*—Allegretti, Newitt, Witcoff & McAndrews

[57] ABSTRACT

A thermally insulating beverage container includes a dispensing assembly releasably secured to a beverage receptacle. The dispensing assembly includes one dispensing member rotatably mounted atop another dispensing member such that rotation thereof to a position in which two openings are in registry permits dispensing of the beverage from the beverage container.

6 Claims, 13 Drawing Figures

U.S. Patent  Feb. 26, 1980  Sheet 1 of 4  4,190,173
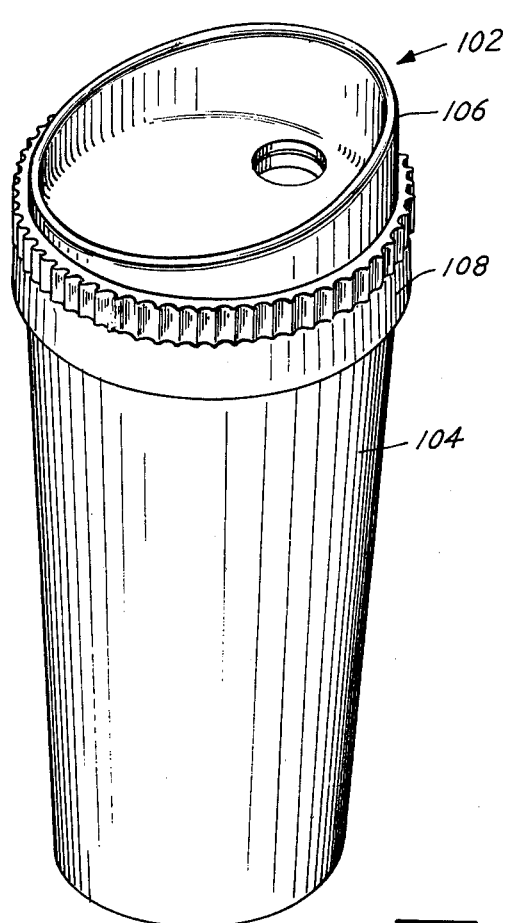
Fig.1
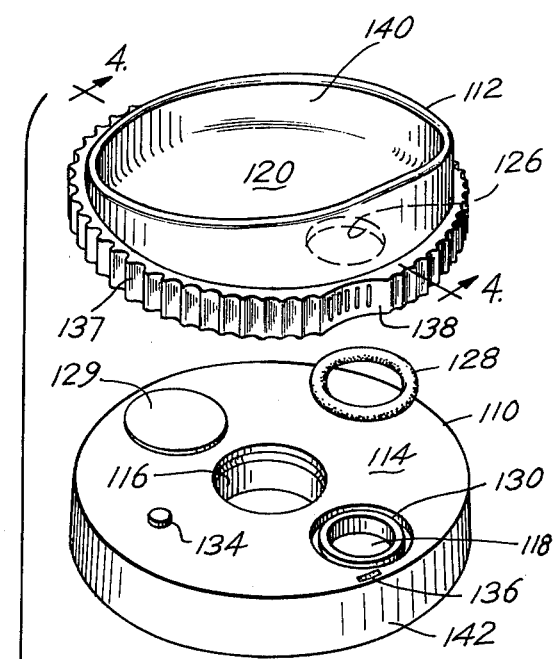
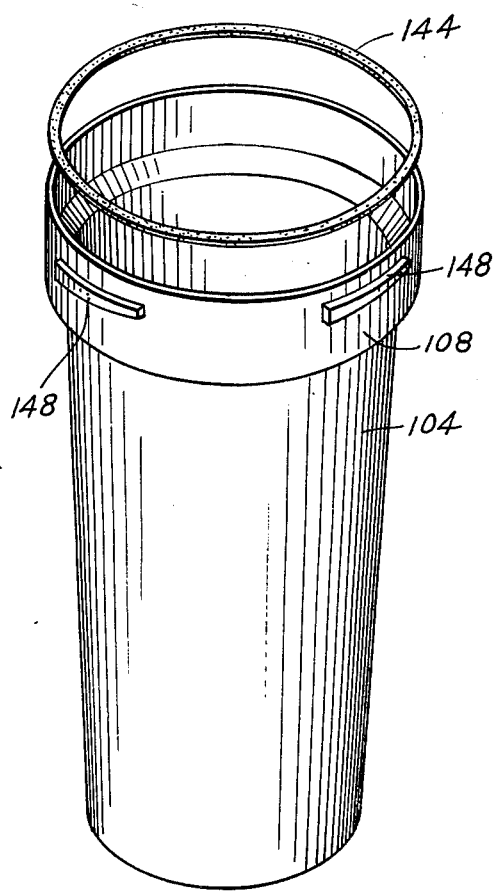
Fig.3
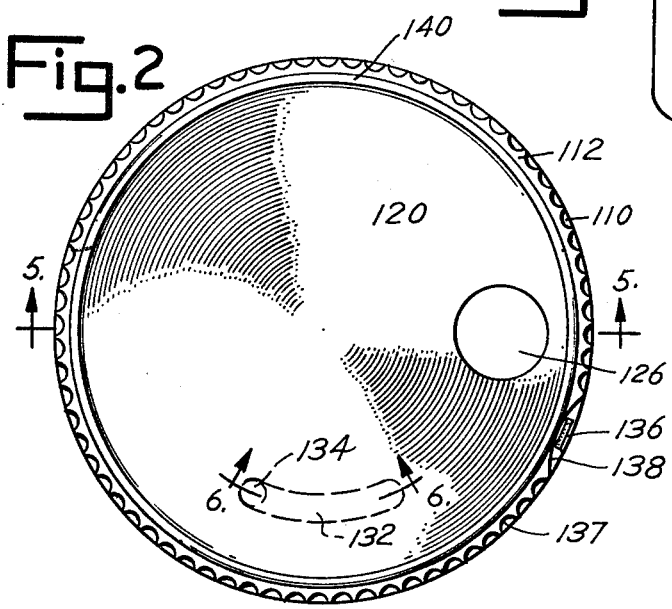
Fig.2

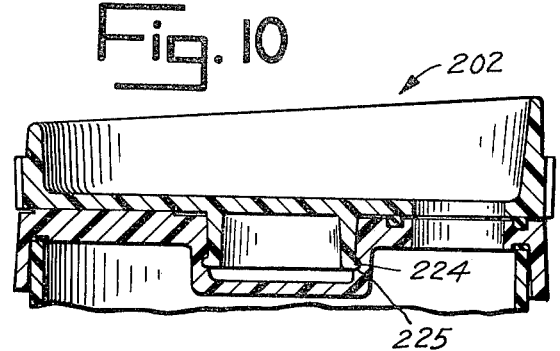
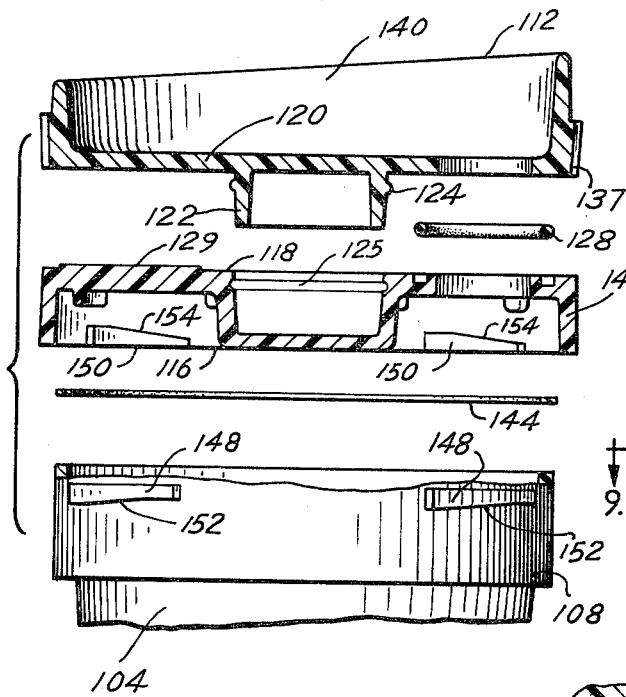
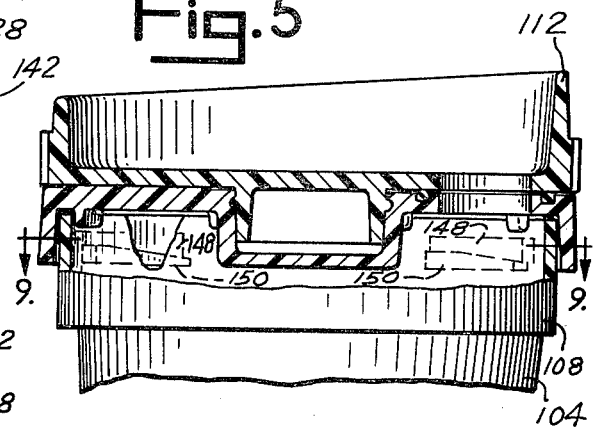
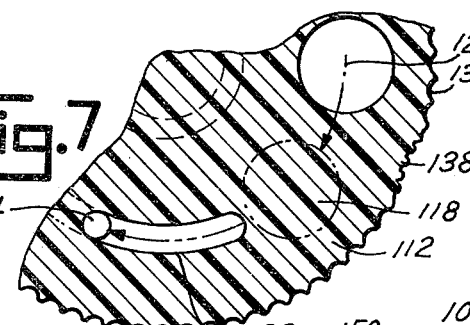
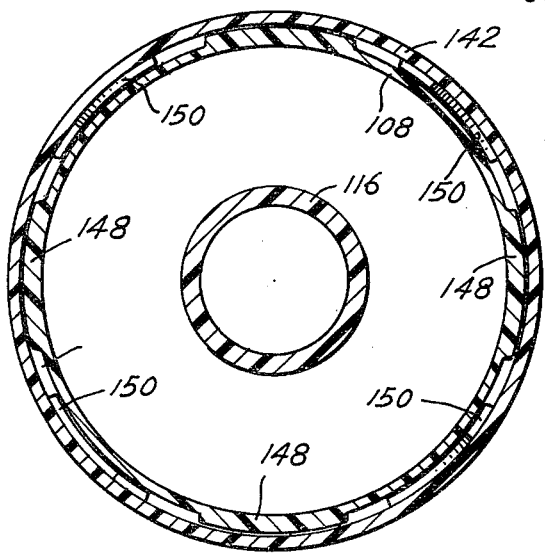
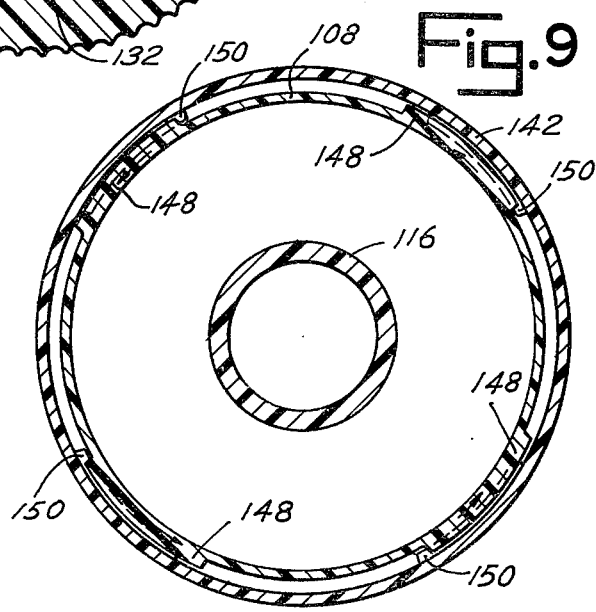

BEVERAGE CONTAINER

This is a continuation of application Ser. No. 877,678 filed Feb. 14, 1978, now abandoned.

BACKGROUND OF THE INVENTION

This invention relates to a beverage container, and more particularly, to a thermally insulating beverage container having a dispensing assembly for use in transporting a beverage serving.

In the past, a variety of beverage containers have been utilized to thermally insulate a hot or cold beverage. Among such containers are vacuum bottles and double-walled tumblers or glasses. While these prior beverage containers have proved useful, there has remained a need for a transportable beverage container that not only thermally insulates a beverage serving, but also provides an easily operated dispensing assembly that prevents leakage and spillage, and is convenient to use for commuters and the like.

While vacuum bottles are transportable, generally they have been constructed with separable cups and removable container plugs. To ready a beverage serving, the user must hold the container in one hand and separate the cup with the other. With the cup put in a resting place, both hands must be used to remove the plug. Then with the cup in one hand, the plug in a resting place and the container in the other hand, the serving can be poured. Finally, the cup must be returned to its resting place and both hands used to replace the plug.

Since this sequence requires the use of two hands and the transfer of liquid from the container to the cup, the sequence is at best inconvenient for users such as commuters. For those who drive automobiles, it may even result in a serious safety hazard, if the driver turns his vision from the roadway or attempts to use both hands in the sequence while driving.

SUMMARY OF THE INVENTION

It is thus an object of the present invention to provide an improved beverage container which is transportable.

Another object of the present invention is to provide an improved, transportable beverage container that thermally insulates the beverage to be transported.

Another object of the present invention is to provide an improved, transportable beverage container suitable for users such as commuters who drive automobiles or ride commuter trains.

Another object of the present invention is to provide an improved, transportable beverage container that prevents leaks and spills during use.

Another object of the present invention to provide an improved beverage container having its top as well as its sides thermally insulated by two wall layers separated by an insulating air space.

Another object of the present invention is to provide an improved beverage container which is more sanitary than prior art containers.

Still another object of the present invention is to provide an improved beverage container which has a reduced number of mechanical components, resulting in reduced breakage.

A further object of the present invention is to provide an improved beverage container which more effectively seals the dispensing opening against leakage when the container is not in use.

A further object of the present invention is to provide an improved beverage container which automatically vents pressure increases in the vapor space above the beverage, while maintaining the seal against leakage.

A still further object of the present invention is to provide an improved beverage container which can be economically mass-produced.

Thus, in a principal aspect, the present invention is an improved beverage container comprising a beverage receptacle having an open top and a rim about the open top, and a dispensing assembly. The dispensing assembly includes a first dispensing member having a first opening defined therein, and a second dispensing member having a second opening defined therein. The first dispensing member and the rim cooperatively define means for releasably securing the dispensing assembly atop the receptacle so that the dispensing assembly is sealed thereto against leakage and so that the beverage may be placed in said beverage receptacle through the open top. The first dispensing member and the second dispensing member cooperatively define means for pivotably mounting the second dispensing member atop the first dispensing member, the second dispensing member thereby being pivotable to and from a pivotable position wherein said second opening is in registry with said first opening. In this position, the first beverage may be dispensed from the beverage receptacle through the openings.

BRIEF DESCRIPTION OF THE DRAWINGS

Three alternative embodiments of the present invention, will be described in relation to the accompanying drawing, wherein:

FIG. 1 is a perspective view of the first alternative embodiment of the present invention;

FIG. 2 is a top plan view of the embodiment of FIG. 1;

FIG. 3 is an exploded, perspective view of the embodiment of FIG. 1;

FIG. 4 is an exploded, cross-sectional view of the embodiment of FIG. 1, taken along line 4—4 of FIG. 3;

FIG. 5 is a cross-sectional, assembly view of the embodiment of FIG. 1, taken along line 5—5 of FIG. 2;

FIG. 6 is a cross-sectional, detail view of the embodiment of FIG. 1, taken along line 6—6 of FIG. 2;

FIG. 7 is a cross sectional, detail view of the embodiment of FIG. 1, taken along line 7—7 of FIG. 6;

FIG. 8 is a cross-sectional view of the embodiment of FIG. 1, taken along line 8—8 of FIG. 5;

FIG. 9 is a cross-sectional view of the embodiment of FIG. 1, similar to FIG. 8;

FIG. 10 is a cross-sectional, assembly view, similar to FIG. 5, of a second alternative embodiment of the present invention;

DETAILED DESCRIPTION OF THE PREFERRED EMBODIMENTS

Figure 13:
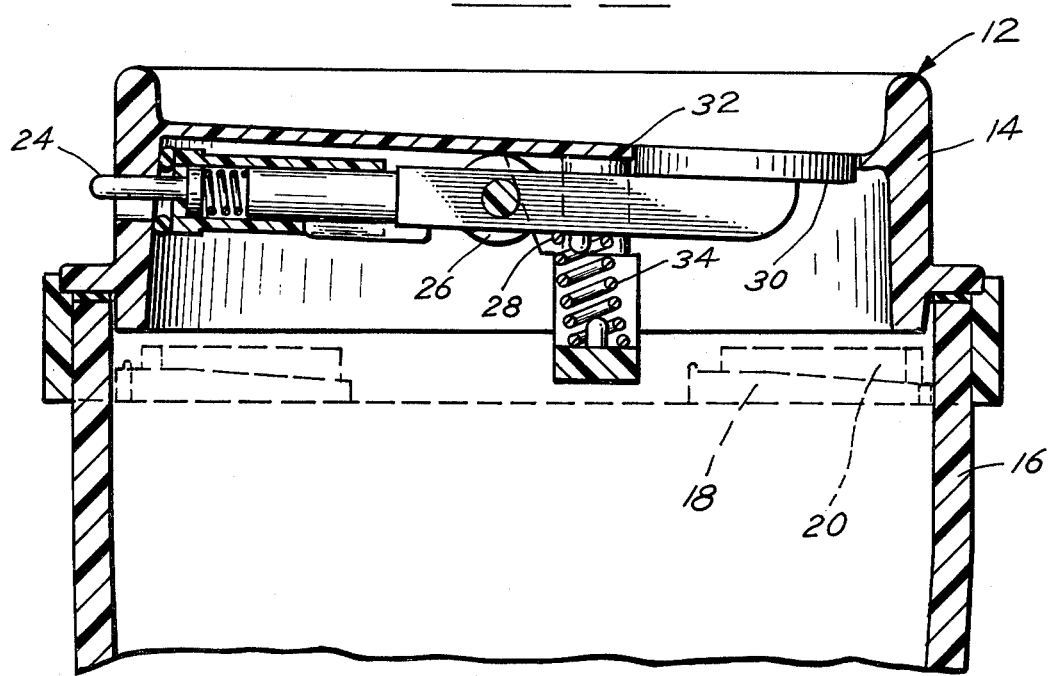
FIG. 13 is a cross-sectional view of the upper end of a known prior art container.

Referring first to FIG. 13, a prior art beverage container 12 is depicted therein. The container 12 includes a lid 14 releasably secured to a receptacle 16 by cooperating lugs 18, 20. The beverage is dispensed from the container 12 by pressing a button 24 inward with the finger, thereby driving a cam follower 26 along a cam surface 28 and lowering the plug 30 from the opening 32. When the button 24 is released, the spring 34 returns the plug 30 to the opening 32.

Figure 11:
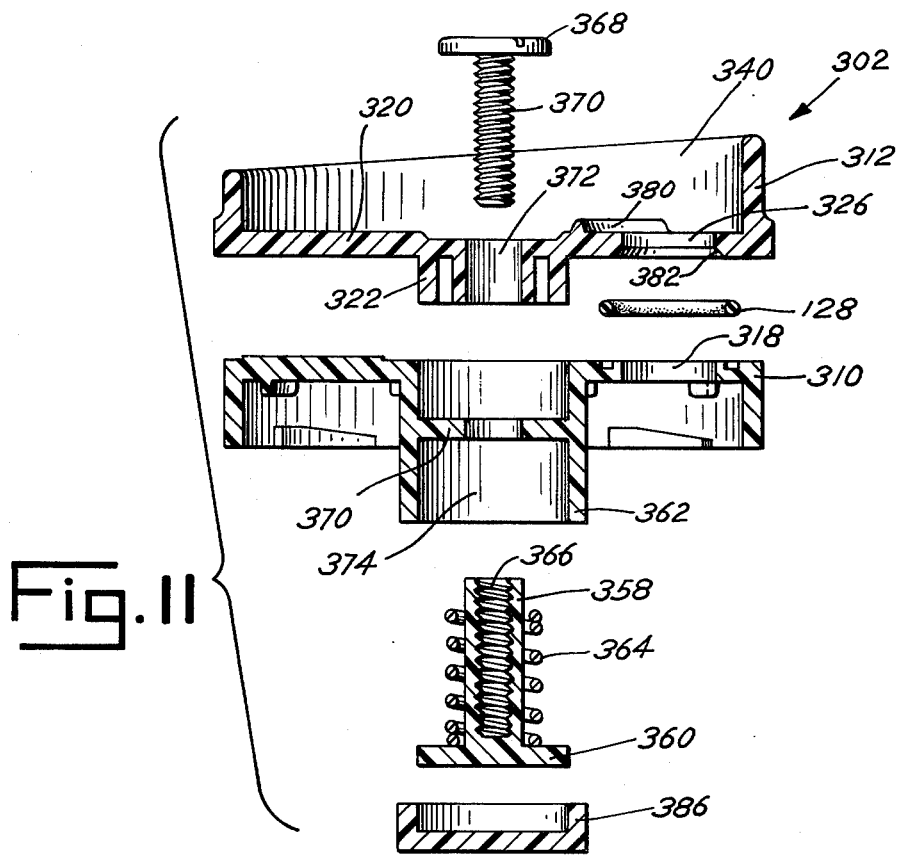
FIG. 11 is an exploded, cross-sectional view, similar to FIG. 4, of a third alternative embodiment of the present invention.
Figure 12:
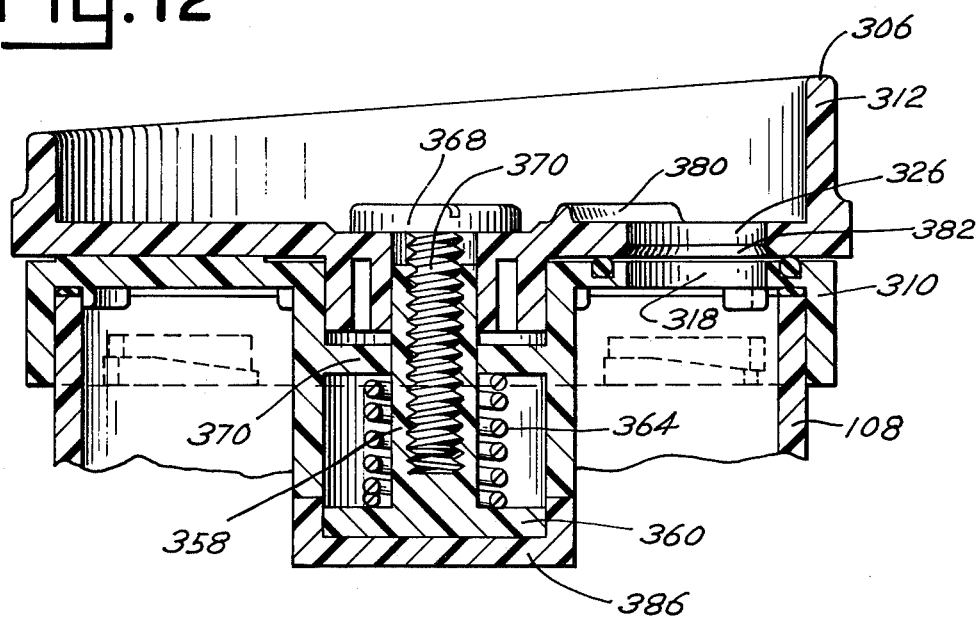
FIG. 12 is a cross-sectional assembly view, similar to FIGS. 5 and 10, of the embodiment of FIG. 11.

Referring now to FIGS. 1–12, a first alternative embodiment 102 of the present invention is depicted in FIGS. 1–9, a second alternative embodiment 202 is depicted in FIG. 10, and a third alternative embodiment 302 of the present invention is depicted in FIGS. 11 and 12.

As exemplified by the first alternative embodiment 102 shown in FIG. 1, the present invention includes a beverage receptacle or container such as the tumbler 104 and a dispensing assembly such as the dispensing assembly 106.

The tumbler 104, which is circular in cross-section and tapered from top to bottom, has an enlarged rim portion 108. Rim 108 surrounds the open top of the tumbler 104, and opens into the interior of the tumbler 104 so that a beverage such as coffee, tea or the like may be received therein. As conventional, the tumbler 104 is molded of plastic and the sidewall of the tumbler 104 is formed in two layers. An inner layer of the sidewall is suspended within an outer layer, and the air space between the layers acts to thermally insulate the outer layer from the beverage. In size, the tumbler 104 is suitable for being held with one hand.

Referring to FIG. 3, the dispensing assembly of the present invention includes two spaced, thermally insulating dispensing members such as the first dispensing member 110 and the second dispensing member 112. When assembled, the second dispensing member 112 is rotatably mounted atop the first dispensing member 110 and the dispensing assembly 106 is removably secured atop the tumbler 104.

A generally planar, circular portion 114 of the first dispensing member 110 has a centrally located, downwardly recessed section 116 and a first opening 118 defined therein. The first opening 118 is circular in cross-section and positioned adjacent the edge of the planar portion 114. The recessed section 116 is cylindrical.

As shown in FIGS. 4 and 5, a planar portion 120 of the second dispensing member 112 has a centrally located, cylindrical extension section 122 extending downwardly therefrom. Together, the section 122 and the section 116 define a type of means for rotatably mounting the second dispensing member 112 atop the first dispensing member 110. That is, the extension section 122 has a diameter and length such that it fits within the recess defined by the recessed section 116, and a protruding, circular ring or "snap ring" 124 is integrally formed thereon such that it fits within a mating groove 125 formed within the recessed section 116. The dispensing members 110, 112 are molded of flexible material such as polypropylene. Thus the dispensing members 110, 112 may be pressed together, and the extension section 122 will flex to allow the snap ring 124 to snap into the groove 125. Alternatively, the extension section 122 could have a plurality of longitudinal slits defined therein to facilitate flexing thereof.

The second dispensing member 112 may thus be mounted atop the first dispensing member 110 for pivotal movement about the co-axial central or longitudinal axes of the extension section 122 and the recessed section 116. A second opening such as second opening 126 is defined in the planar portion 120 adjacent the edge thereof, at a distance from the central axis of the extension section 122 substantially equal to the distance of the first opening 118 from the central axis of the recessed section 116. As a result, the dispensing member 112 may be pivoted in relation to the dispensing member 110 toward and away from a position in which the second opening 126 is in registry with the first opening 118. In this position, the beverage may be dispensed through the openings 118, 126.

To prevent the leakage of the beverage from between the second dispensing member 112 and the first dispensing member 110, an O-ring 128, formed of rubber or the like, is positioned therebetween, about the openings 118, 126. An annular recess 130 is defined in the planar portion 114 around the first opening 118. Into this recess 130, the O-ring 128 is placed, before the members 110, 112 are assembled. By molding the snap ring 124 at a distance along the extension 122 so that the extension section 122 is in tension when the members 110, 112 are assembled, a suitably tight seal can be maintained between the O-ring 128 and the members 110, 112.

A raised circular section 129 integrally formed atop the planar portion 114, opposite the first opening 118, has a height substantially equal to that the O-ring 128 has when placed in the recess 130. Section 129 thus assists in maintaining the planar portions 114, 120 in parallel relationship, in maintaining the seal between members 110, 112 and the O-ring 128, and in holding the members 110, 112 apart, thereby creating a thermally insulating layer of air therebetween.

Referring now to FIGS. 2, 3, 6, and 7, the dispensing member 110, 112 cooperatively define means for limiting the pivotal movement of the member 112 in relation to the member 110. Among other advantages, this limiting means provides positive stops so that a person occupied by other matters can know, without making a visual examination, whether the second opening 126 is in registry with the first opening 118.

As preferred, the limiting means includes an arcuate channel 132 defined on the underside of the planar portion 120 and a raised knob 134 on the planar portion 114. As shown in FIG. 2, the knob 134 and the channel 132 are positioned at substantially equal distances from the axis of rotation of the second dispensing member 112, and the channel 132 forms an arc of a circle having its axis at said center.

With the channel 132 and the knob 134 so positioned, the pivotal movement of the second dispensing member 112 is limited to an arc of length equal to the length of the channel 132. When the second dispensing member 112 is pivoted so that the knob 134 is at one end of the channel 132, as indicated by the arrows, the openings 118, 126 are in registry. Thus the position of the second dispensing member 112 may be known without visual examination.

To draw attention to the fact that the openings 118, 126 are in registry, if a cursory visual examination of the dispensing assembly 106 is made, a brightly-colored marker 136, shown in FIG. 3, is positioned atop the planar portion 114 at the edge thereof. When the openings 118, 126 are in registry, the marker 136 is exposed to visual observation as shown in FIG. 2.

For ease of operation, the second dispensing member 112 includes a row of ribs 137 about the outer periphery thereof, and a thumb groove 138. The tumbler 104 may thus be held in the palm of the hand and the thumb used to operate the dispensing assembly. Extending perpendicularly to the plane of, and above, the planar portion 120 is an integrally formed, cylindrical lip 140, which contains spills which occur from jostling of the container while the openings 118, 126 are in registry.

Finally, as shown in FIGS. 3, 4, 5, 8 and 9, means for releasably securing and sealing the dispensing assembly 106 to the tumbler 104 are cooperatively defined on the first dispensing member 110 and on the rim 108. Extending downward perpendicularly from the plane of the planar portion 114 of the first dispensing member 110 is an annular portion 142. The inner diameter of the annular portion 142 is substantially equal to but larger than the outer diameter of the rim 108. When placed atop the tumbler 104, the annular portion 142 fits down over the rim 108 and the planar portion 114 rests atop an annular gasket 144 which in turn rests atop the top edge of the rim 108. Tabs 146 keep the gasket 144 in position against the planar portion 114.

As preferred, the means for releasably securing and sealing the dispensing assembly 106 to the tumbler 104 include a plurality of circumferentially spaced, outwardly projecting lugs 148 integrally formed on the rim 108, and a plurality of circumferentially spaced, inwardly projecting mating lugs 150 integrally formed on the annular portion 142. The lugs 148 define downwardly directed, inclined cam surfaces 152 and the mating lugs 150 define upwardly directed, inclined mating cam surfaces 154. The dispensing assembly 106 is secured or "locked" atop the tumbler 104 by placing it thereon, with the lugs 148, 150 interspaced as shown in FIG. 8, and rotating it to the position of FIGS. 5 and 9, so that the cam surfaces 152, 154 abut one another and the lugs 148 overly the mating lugs 150. In this position, the lugs 148, 150 interact to place the annular portion 142 in tension between the top edge of the rim 108 and the lugs 152, and to prevent the dispensing assembly 106 from being removed unless the first dispensing member 110 is forcibly rotated, to the position of FIG. 8, and then lifted.

To prevent the dispensing assembly 106 from being accidentally freed from the tumbler 104 when the second dispensing member 112 is pivoted, the cam surfaces 152, 154 are inclined about 20° from the plane of the planar portion 114. As a result, a significantly stronger force is needed to rotate the first dispensing member 110 in relation to the tumbler 104 than is needed to pivot the second dispensing member 112 in relation to the first dispensing member 110.

Turning now to FIG. 10, the second embodiment 202 of the present invention includes all the features and advantages of the first embodiment 102, but the snap ring 224 is shifted to the lower end of the annular extension section 222 of the second dispensing member 212. To mate with the snap ring 224, the groove 225 is also shifted downward, toward the bottom of the recessed section 226 of the first dispensing member 210. As so constructed, the second dispensing member 212 is significantly more readily molded.

Referring finally to FIGS. 11 and 12, the third alternative embodiment 302 of the present invention includes a dispensing assembly 306 which principally differs from the dispensing assemblies 106 and 206 in that it includes an improved mechanism for pivotally mounting the second dispensing member 312 atop the first dispensing member 310. This mechanism is suitable for adjusting both the tension with which the second dispensing member 312 is held atop the first dispensing member 310 and the force necessary to pivot the second dispensing member 312. In addition, this mechanism vents pressure increases in the vapor space above the beverage, which would otherwise build inside the receptacle 104.

Preferably, this mechanism includes a post member such as the generally cylindrical post 358 slidably mounted within a first channel 374 defined by a centrally located, generally cylindrical and downwardly recessed first sleeve portion or section 362 of the first dispensing member 310. The section 362 is sealed from the beverage by a cap 386 fastened thereto. Mounted on the post 358 is a spring such as the helical spring 364 which abuts the enlarged, lower end portion 360 of the post 358. Defined within the post 358 is a threaded recess 366, into which a fastener such as a screw 368 is threadable.

When assembled, the head of the screw 368 rests atop the planar portion 320 and the threaded portion 370 thereof extends through a generally cylindrical second channel or slot 372, defined by a centrally located, downwardly extending second sleeve portion or section 322, to engage the post 360. The spring 364 is compressed between the lower end portion 360 and an annular, inwardly extending ledge 370 formed on the section 362.

When pressure builds in the closed receptacle 104, an upward force due to the pressure acts against the member 312 over the area of the opening 318. When the pressure becomes so great as to overcome the biasing force of the spring 364, the dispensing member 312 moves or rises, permitting the pressure to vent between the members 310, 312 and out the openings 318, 326. As the pressure decreases, the biasing force of the spring 364 overcomes the force of the pressure and returns the member 312 to its original position. Thus the assembly 306 automatically and intermittently vents excess pressure in the receptacle 104.

A range of pressures at which the assembly 306 can vent the receptacle 104 is selectable through choice of the spring 364 and the exact pressure at which the assembly 306 vents is adjustable with the screw 368. That is, by rotating the screw 368 in relation to the post 358, the compression and thus the biasing force of the spring 364 may be varied. It has been found that a range of biasing forces acceptable for venting the receptacle 104 also results in a suitable sealing tension between the dispensing members 310, 312 and a suitable force for the pivoting of the second dispensing member 312 in relation to the first dispensing member 310. Thus the assembly 306 intermittently and automatically vents the receptacle 104 at a pre-selected maximum pressure therein while simultaneously sealing the receptacle 104 against spillage, and providing for ready use thereof.

The dispensing assembly 306 further differs from the dispensing assemblies 106 and 206 in that it includes a raised, arcuate rib formed atop the section 320 about the opening and a fillet 382 defined along the lower edge of the opening 326. The fillet 382 prevents damage to the O-ring 128; the rib 380 strengthens the member 312 and confines spillage. In the area between the rib 380 and the lip 340, the section 320 is slanted downward toward the opening 326. Spillage of the beverage is thus confined and drains into the receptacle 104.

From the foregoing, it should be apparent to those having average skill in the art that modifications and changes could be made to the beverage container disclosed herein. Thus, the preferred embodiment of the present invention is to be considered as illustrative and not restrictive, and all embodiments which come within the scope of the claims and are equivalent thereto should be considered as embraced therein.

What is claimed is:

1. An improved beverage container comprising, in combination:
   a beverage receptacle having an open top and a rim about said open top; and
   a dispensing assembly including,
   a first dispensing member having a generally planar portion with a first opening defined therein and a first sleeve portion with a passageway defined therein interrupted by a radially, inwardly extending ledge,
   a second dispensing member having a generally planar portion defining a second opening and a second sleeve portion defining a second passageway;
   said first dispensing member and said rim cooperatively defining means for releasably securing said dispensing assembly atop said receptacle so that said dispensing assembly is sealed thereto against beverage leakage and so that said beverage may be placed in said beverage receptacle through said open top;
   said first dispensing member and said second dispensing member cooperatively defining means for (1) rotatably pivotly mounting said second dispensing member atop said first dispensing member, said second dispensing member thereby rotatably pivotable to and from a pivotal position wherein said second opening is in registry with said first opening so that the beverage may be dispensed from said beverage receptacle through the openings, and (2) automatically venting said receptacle through the first and second openings when the pressure within said receptacle exceeds a pre-selected maximum pressure when said first and second openings are not in registry,
   said mounting and venting means including,
   a post member slidably mounted within said first passageway of said first sleeve portion and having an end;
   spring means mounted on said post member compressible between said end and said ledge; and
   a fastener member fastened to said post member through said second passageway of said second sleeve portion for compressing said spring means to a pre-selected biasing force,
   whereby said second dispensing member is maintained in relation to said first dispensing member whenever said pre-selected biasing force is not less than the force of said pressure and is moved to permit said venting through said first opening whenever the force of said pressure acting on said second dispensing member exceeds said preselected biasing force.

2. The improved beverage container of claim 1 wherein said dispensing asembly includes an end cap sealed to said first sleeve portion to seal said spring means from said beverage.

3. The improved beverage container of claim 1 wherein said spring means includes a helical spring.

4. The improved beverage container of claim 1 wherein said first dispensing member includes an annular recess about said first opening and said dispensing assembly further includes an O-ring in said annular recess, said O-ring sealing said first dispensing member and said second dispensing member against leakage of beverage therebetween.

5. The improved beverage container of claim 1 wherein said first sleeve portion is centrally located in said generally planar portion of said first dispensing member, downwardly recessed therefrom and generally cylindrical.

6. The improved beverage container of claim 1 wherein said second sleeve portion is centrally located in said generally planar portion of said second dispensing member, downwardly extending therefrom and generally cylindrical.

* * * * *